United States Patent Office 3,696,019
Patented Oct. 3, 1972

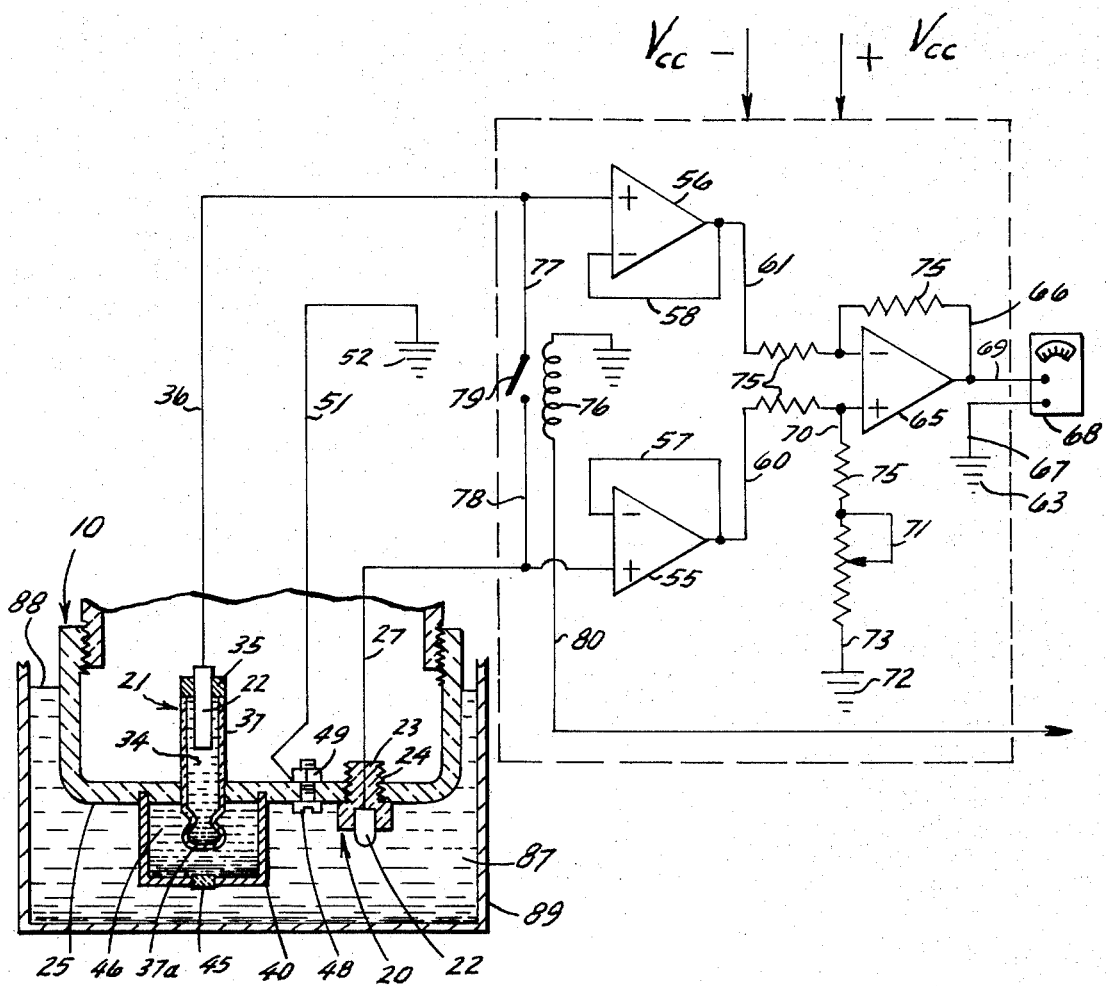

3,696,019
THALLIUM ALLOY ELECTRODE
James R. Arrington, Muskego, and Karl Lewis King, Milwaukee, Wis., assignors to American Limnetics Instruments, Inc.
Filed June 5, 1970, Ser. No. 43,863
Int. Cl. B01k 3/04, 3/06
U.S. Cl. 204—290 R  4 Claims

ABSTRACT OF THE DISCLOSURE

An electrode for sensing dissolved oxygen in an electrolytic media is composed of a core having a major portion of thallium and a minor amount of mercury and an outer coating of a saturated thallium-mercury amalgam thereon. The electrode core is formed as a solid electrode and the preferred amount of thallium is 87% by weight with the mercury being present in the amount of 13%. The electrode composition is employed to sense dissolved oxygen in an electrolytic media and is substantially unaffected by wide variations in temperature, pH, pressure, salinity and flow rate.

BACKGROUND OF THE INVENTION

This invention relates to an electrode composition and process which is employed for making dissolved oxygen determinations in an electrolytic media. More particularly, the invention relates to an electrode for sensing oxygen in a liquid which is composed of approximately 87% by weight of thallium and 13% by weight of mercury. Further processing forms a fluid film on the surface of the electrode to make it less susceptible to fouling and chemical poisoning by the surrounding media while at the same time providing an electrode which is highly accurate in its determinations.

An electrode system for measuring concentrations of oxygen dissolved in a liquid such as water is disclosed in U.S. 3,218,242. In this particular patent, an electrode composed of metallic thallium and a second reference electrode is utilized. It has been found that while such an electrode may be useful under ideal conditions, it is not accurate when dissolved oxygen determinations are to be made in a liquid which have varying pH concentrations, flow rates, and salinity concentrations. Some studies have been conducted on using amalgam type electrodes for use in galvanic cells. This is disclosed by Roscoe H. Gerke in the Journal of American Chemical Society, volume 44, 1922, pages 1684–1704. This article describes thallium-mercury amalgam electrodes which are of the liquid type and describes temperature coefficients of electromotive forces of the galvanic cells in which they are employed.

There is not currently available an electrode for making dissolved oxygen determinations which can be easily handled, such as in the solid form, and yet is highly accurate in its determinations. Neither does the prior art disclose an electrode composition which can be employed to make dissolved oxygen determinations under severe conditions such as the effluent from sewage treatment plants where salinity may vary widely or in limnological work where dissolved oxygen is measured in water where there is no significant circulation.

It is an object of the present invention to provide a novel electrode sensing composition which will effect highly accurate determinations. It is another object of this invention to provide an electrode composition which is relatively unaffected by wide variations in temperature, pH, pressure, salinity and flow rate. It is still another object of this invention to provide an electrode composition which is easily manufactured and suitable for incorporation into an electronic circuit without requiring special adaptations. It is another object of this invention to provide a novel composition for an electrode sensing device wherein the electrode composition is especially adapted to being used in the sensing system which obviates the use of a reference electrode.

SUMMARY OF THE INVENTION

The foregoing objects are accomplished and the shortcomings of the prior art are overcome by the present electrode which is a solid material containing thallium in a major amount and mercury in a minor amount. Further processing forms a fluid mercury-thallium film on the surface of the electrode which results in an electrode which is resistant to poisoning. Quite unexpectedly, it was found that when the thallium is utilized in an amount of about 87% and the mercury in an amount of about 13%, a solid electrode composition results which is very accurate, it being relatively unaffected by such normally encountered conditions such as pH, salinity, temperature variations and flow rate.

BRIEF DESCRIPTION OF THE DRAWING

A better understanding of the present electrode composition will be accomplished by reference to the drawing wherein:

The figure is a view in vertical section of a preferred embodiment showing the electrode composition contained in a preferred electrode sensing unit and connected to the electronic amplifying and recording means.

BRIEF DESCRIPTION OF THE PREFERRED EMBODIMENT

The following specific example is set forth for the purpose of illustrating the invention and should not be construed to limit the invention to the precise ingredients, proportions or steps shown.

EXAMPLE

Forty-four grams of thallium metal are melted in a ceramic crucible by suitable means such as a reducing gas flame. To the melted thallium is added six grams of clean mercury and the metals are mixed by stirring with a Pyrex rod. The molten alloy is poured into a metal mold and the mold dropped into water at room temperature for cooling purposes. After cooling, the electrode is removed from the mold and washed in tap water to remove any surface oxide.

A saturated thallium amalgam is next prepared by adding excess thallium metal to clean mercury, in a suitable container. The liquid amalgam is decanted from the thallium chunk into a glass container. The electrode which was prepared from the mold is dried and briefly dipped into the decanted saturated thallium amalgam. The electrode is rubbed with a soft cloth or paper towel so that the adhering drops of amalgam are distributed over the surface of the electrode. This gives the electrode a bright metallic luster and forms an extremely thin and very tenacious liquid film.

The novel electrode composition is formed in the small rod like members as shown by the numerals 22 in the probe device generally 10 shown in the figure. The probe contains two measuring electrode units 20 and 21 extending through the end wall 25 of probe. Electrode 22 in electrode unit 20 is surrounded by cylindrical plastic plug member 23 which is screwed through end wall 25 by means of threads 24. Conductor 27 is disposed through plug 24 by means of an accommodating channel secured by epoxy glue. It is secured to electrode 22 in plug 23 by means of soldering. In electrode unit 21 the sensing electrode 22 is contained within a standard pH sensitive glass electrode blank 37. The glass electrode is filled with an inner filling solution 34 composed of 100 parts of potassium di-hydrogen phosphate at 0.1 molar strength and eleven parts of 0.1 molar sodium hydroxide and two parts of saturated thallium phosphate (Tl₃PO₄). This solution simulates a stable dissolved oxygen concentration. A plug 35 seals the solution to prevent oxygen from entering the glass electrode. The glass pH electrode blank 37 prevents diffusion of oxygen into the inner filling solution 34 and also allows electrical connection to outer filling solution 46 and correction of the electrode potential to simulate a specific dissolved oxygen level. The correction is accomplished by varying the pH of the outer filling solution 46. A cylindrical isolating member 40 encompasses the tip 37a of a glass blank 37 and is fitted into end wall 25 by means of a circular groove and epoxy cement. A ceramic plug is disposed in member 40 which seales in outer filling solution 46 which in this instance is a phosphate buffer of the required pH yet allows electrical communication with electrode 22. Disposed adjacent isolating member 40 is a screw 48 and nut 49 which secure conductor 51 to end wall 25 with screw 48 acting as a ground.

Conductor 27 leading from electrode unit 20 is connected to the input side of a non-inverting, field effect transistor, high impedance amplifier 55. In a similar manner, conductor 36 connects electrode unit 21 with a non-inverting, field effect, impedance amplifier 56 and on the input side. Each amplifier 55 and 56 is provided with conductors 57 and 58 which provide negative feedback to accomplish the impedance of amplifiers 55 and 56, respectively, to the input side of the differential, operational amplifier 65 which also has a conductor 66 leading from the negative input side to the output side. Differential amlifier 65 is interconnected to a meter 68 by means of conductor 69 with meter 68 being grounded at 63 through conductor 67. Interconnected with conductor 60 leading to the positive input side of amplifier 65 is conductor 70 connecting with a common mode adjustment potentiometer 71 which is grounded at 72 through conductor 73. The usual resistors 75 are employed in conjunction with amplifier 65 and potentiometer 71. In order to balance the electronics, a reed relay 76 is provided on the input side of amplifiers 55 and 56 and interconnected by conductors 77 and 78 with switch 79. Conductor 80 provides the necessary lead to a control box (not shown) which would have also included the meter 68, as well as power lines Vcc− and Vcc+.

OPERATION OF THE PREFERRED EMBODIMENT

A better understanding of the advantages of the electrode composition which composes the sensing electrodes 22, will be had by a description of the operation of sensing probe 10. The Probe 10 is placed in an aqueous solution 87 such as water where dissolved oxygen is to be measured. The probe will be inserted such that sensing electrode 22 of unit 20 and the isolating member 44 of sensing unit 21 is surrounded by the solution. The level should be at least as high as indicated by the water level 88 as shown in container 89. With sufficient electrical power being supplied to the amplifiers 55, 56 and 65, the electrical potential sensed by electrodes 22 and supplied to amplifiers 55, 56 and 65 will be an indication of the amount of thallous ion produced by dissolved oxygen in the liquid as compared to the amount of thallous ion which may be contained in the standard inner filler solution 34 contained in glass blank 37. The production of potential by electrodes of this type as an indication of oxygen content is believed to take place as follows:

(1) Dissolved oxygen reacts with the thallium metal.

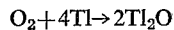

(2) The thallium oxide reacts with the water present.

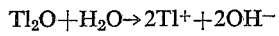

(3) The electrode senses the concentration of the Tl⁺ ion produced according to the following equation.

$$E = Eo^{(T)} + \frac{KT}{q} \ln([Tl^+]) \text{ Nernst equation}$$

E: Electrode potential.
Eo: Electrode potential when second term is zero.
K,q: Thermodynamic constants.
T: Electrode temperature in degrees Kelvin.
ln: Natural logarithm function.
[Tl⁺]: Concentration of thallous ions.

From 1 and 2, it can be seen that the thallous ion concentration is proportional to the oxygen concentration (assuming the fluid being measured is moving).

$$[Tl^+] = 4[O_2]$$

Therefore, $$E = Eo + \frac{KT}{q} \ln(4) + \frac{KT}{q} \ln([O_2])$$

In a general form, $$E = a + b \ln([O_2])$$

where $a$ and $b$ are constants.
By electronic processing, we obtain $$\ln([O_2]) = \frac{(E-a)}{b}$$

The flow of current is accomplished by both electrodes 22 with common ground 48 through porous plug 45 and pH glass blank 37. The glass tip 37 shields inner filler solution 34 from any dissolved oxygen that would contaminate the inner filler solution 34. An indication of the dissolved oxygen in solution 87 will be read on meter 68 which is commonly grounded to electrodes 22 by ground 63 and 52, and can be of the continuous recording type.

Actual test results made in conjunction with salinity, pH and temperature dependence were conducted in media containing dissolved oxygen in two parts per million in one instance and eight parts per million in another. In the salinity test, and employing salt in parts per thousand ranging from 0 to 40 it was shown that there was insignificant deviation from 0 to 10 parts per thousand salinity when two parts per million of dissolved oxygen is present and insignificant deviation up to five parts per thousand when dissolved oxygen was present in eight parts per million. Concerning the pH test, there was no deviation between 3.5 to 10 pH when dissolved oxygen was present in two parts per million and no deviation from 4.5 to 9.25 pH when eight parts per million dissolved oxygen were tested. Concerning the temperature dependence, utilizing a temperature range from 0 to 25 degrees centigrade the deviation was only .25 part per million dissolved oxygen when the two parts per million dissolved oxygen tests were made and only .75 part per million over the entire range when eight parts per million dissolved oxygen was utilized. A further test was made to illustrate flow dependence which test showed no deviation in dissolved oxygen readings from .5 centimeter per second flow rate up to and including 4 centimeters per second.

Throughout use in the previously described sensing system, the thallium-mercury electrode will undergo a change in concentration of the thallium atoms at the surface of the electrode which has a fluid mercury amalgam surface. The thallium metal is removed from the surface of the electrode due to the reaction of dissolved oxygen. This temporarily produces a film of thallium amalgam which is not saturated. As the inner part of the electrode is of higher concentration, thallium atoms diffuse and the layer becomes resaturated with thallium atoms. The atoms diffuse with sufficient speed so that the layer remains essentially saturated until the bulk of the thallium is exhausted. At this point the electrode must be replaced. However, under normal conditions, this would not occur until two to four years after initial operation.

As previously described, the composition of the sensing electrodes 22 is 87% thallium and 13% mercury. While these percentages of composition are essential if accurate tests and a solid electrode is to be achieved and employed, these amounts can be varied with the amounts of thallium ranging from 85% to 98% by weight with the balance of mercury being 15% to 2%. If more than 13% mercury is utilized, the electrode tends to become "slushy" and if less than 13% mercury is utilized it will be absorbed by the thallium and the electrode will be more sensitive to poisoning.

The novel electrodes 22 as described in FIG. 1, are also described in another embodiment for making dissolved oxygen determinations. This is an electrode system described in a copending application, Ser. No. 43,864, filed June 5, 1970, by the same inventors. The composition of various components of the figure sensing system is described therein. However, it will be stated generally that the pH glass blank 37 is available from the Corning Company and the isolating member 40, and plugs 35 and 24 are composed of polyvinyl chloride.

It will thus be seen that there is now provided electrode composition for measuring dissolved oxygen in a liquid such as water which is highly effective in making determinations and relatively unaffected by other environmental factors. The electrode composition has a long life and being in the solid form is easily incorporated into an electronic circuit. The composition is sensitive at low flow rates yet is insensitive when the flow rates are varied. The electrode composition can make accurate dissolved oxygen determinations without compensation for temperature, pH, salinity, pressure and the like factors.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

We claim:

1. An electrode composition for sensing dissolved oxygen in an electrolytic medium comprising a core of a solid alloy comprising thallium present in a major amount and mercury present in a minor amount and an outer coating on said core comprised of substantial saturated thallium-mercury amalgam.

2. The electrode composition as defined in claim 1 wherein the core of said electrode is formed of a mixture comprised of thallium present in the range of 85% to 98% by weight of the mixture and the balance mercury present in the range of 15% to 2% by weight of the mixture.

3. The electrode composition as defined in claim 1 wherein said thallium is present in said core in an amount of at least 85% by weight of the composition and said mercury is present in an amount of about at most 15%.

4. The electrode composition as defined in claim 1 wherein said thallium in said core is present in an amount of about 87% and said mercury is present in an amount of about 13%.

References Cited
UNITED STATES PATENTS

| 3,374,093 | 3/1968 | King | 75—134 T |
| 3,190,826 | 6/1965 | Fricke | 204—195 |
| 3,218,242 | 11/1965 | Capuano | 204—1 T |

GERALD L. KAPLAN, Primary Examiner

U.S. Cl. X.R.

75—134 T; 204—1 T, 195 R, 195 G, 195 H, 195 F; 324—29